(12) United States Patent
Charlton

(10) Patent No.: US 7,061,445 B2
(45) Date of Patent: Jun. 13, 2006

(54) MULTIBAND/MULTICHANNEL WIRELESS FEEDER APPROACH

(75) Inventor: Thomas E. Charlton, Sedona, AZ (US)

(73) Assignee: Andrew Corporation, Orland Park, IL (US)

(*) Notice: Subject to any disclaimer, the term of this patent is extended or adjusted under 35 U.S.C. 154(b) by 99 days.

(21) Appl. No.: 10/648,087

(22) Filed: Aug. 26, 2003

(65) Prior Publication Data

US 2005/0057429 A1  Mar. 17, 2005

(51) Int. Cl.
*H01Q 1/12* (2006.01)

(52) U.S. Cl. .................................. 343/890; 343/891

(58) Field of Classification Search ............... 455/129; 333/125–126, 110, 249, 134, 239, 114, 26; 343/891, 890; 29/600
See application file for complete search history.

(56) References Cited

U.S. PATENT DOCUMENTS

| | | | | |
|---|---|---|---|---|
| 4,132,992 A | | 1/1979 | Perrotti ................. 343/100 PE |
| 4,303,900 A | | 12/1981 | Tourneur ..................... 333/239 |
| 4,490,696 A | | 12/1984 | Takeda et al. .............. 333/137 |
| 4,491,810 A | | 1/1985 | Saad ........................... 333/126 |
| 4,498,062 A | | 2/1985 | Massaglia et al. .......... 333/135 |
| 4,564,826 A | * | 1/1986 | Wiesenfarth et al. ....... 333/249 |
| 4,613,836 A | | 9/1986 | Evans ......................... 333/159 |
| 4,630,316 A | * | 12/1986 | Vaughan ..................... 455/129 |
| 4,763,132 A | * | 8/1988 | Juds et al. .................. 343/890 |
| 4,809,357 A | * | 2/1989 | Vaughan ..................... 455/129 |
| 4,885,839 A | * | 12/1989 | Ben-Dov ...................... 29/600 |
| 4,894,625 A | * | 1/1990 | Niekamp et al. ............. 333/33 |
| 4,914,443 A | * | 4/1990 | Gans et al. ................. 342/361 |
| 5,014,021 A | | 5/1991 | Robertson, Jr. et al. ...... 331/96 |
| 5,229,736 A | | 7/1993 | Adams et al. ............ 333/21 A |
| 5,235,297 A | * | 8/1993 | Tawil ......................... 333/110 |
| 5,384,557 A | | 1/1995 | Yoshida et al. ........... 333/21 A |
| 5,832,380 A | * | 11/1998 | Ray et al. ................... 455/431 |
| 6,052,044 A | * | 4/2000 | Aves ........................... 333/239 |
| 6,108,539 A | * | 8/2000 | Ray et al. ................... 455/430 |
| 6,127,901 A | | 10/2000 | Lynch ......................... 333/26 |
| 6,452,561 B1 | | 9/2002 | West et al. ................. 343/772 |
| 6,472,951 B1 | * | 10/2002 | Fiedziuszko et al. ....... 333/126 |
| 6,538,529 B1 | * | 3/2003 | Stenberg et al. ............ 333/134 |

\* cited by examiner

*Primary Examiner*—Tan Ho
*Assistant Examiner*—Hung Tran Vy
(74) *Attorney, Agent, or Firm*—Wood, Herron & Evans, LLP

(57) ABSTRACT

An antenna system comprising a support structure and a multiband/multichannel wireless feeder configured for coupling antennas located proximate the top of a support structure with electronics located proximate the base of the support structure to overcome losses typically associated with coaxial cables. Such a multiband/multichannel wireless feeder includes a waveguide having a coupling at each end and a multiplexing waveguide network coupled at each end of the waveguide and configured to combine frequencies and applications.

32 Claims, 2 Drawing Sheets

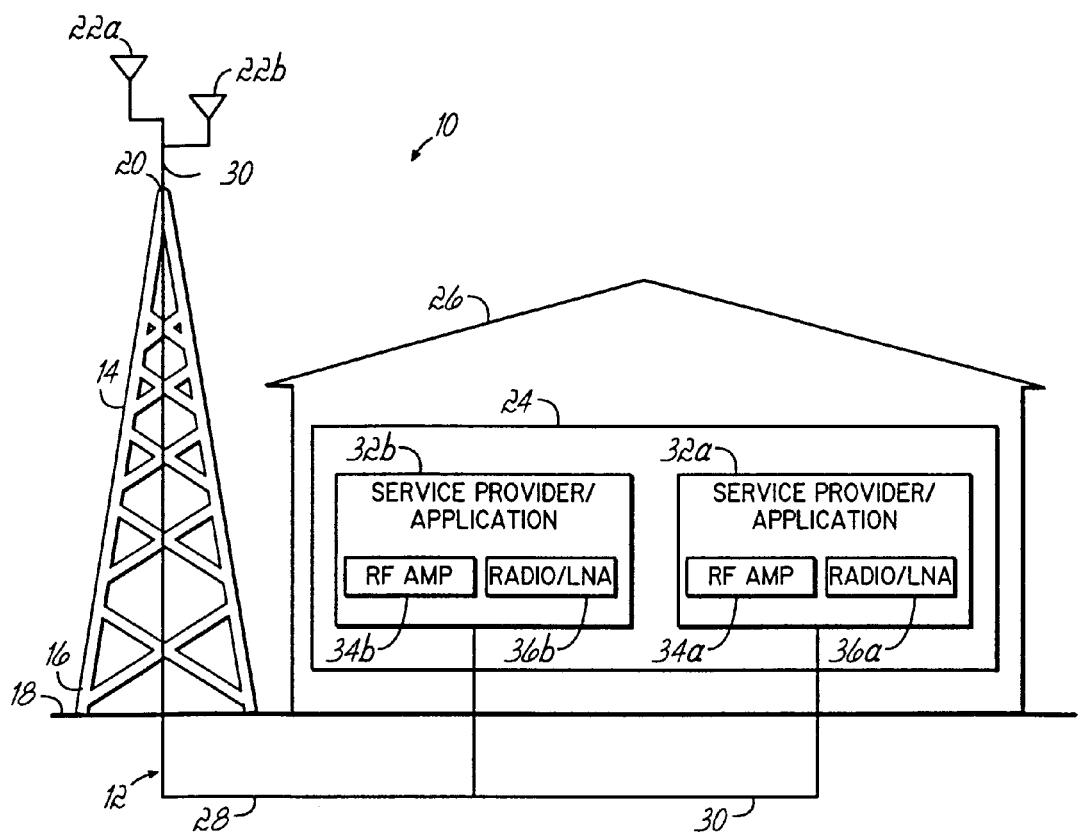
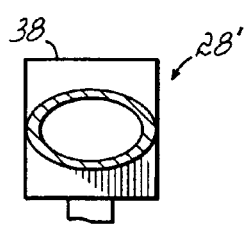
FIG. 2A
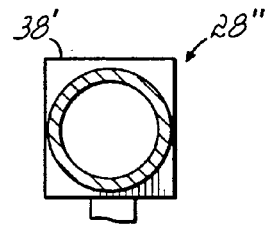
FIG. 3A

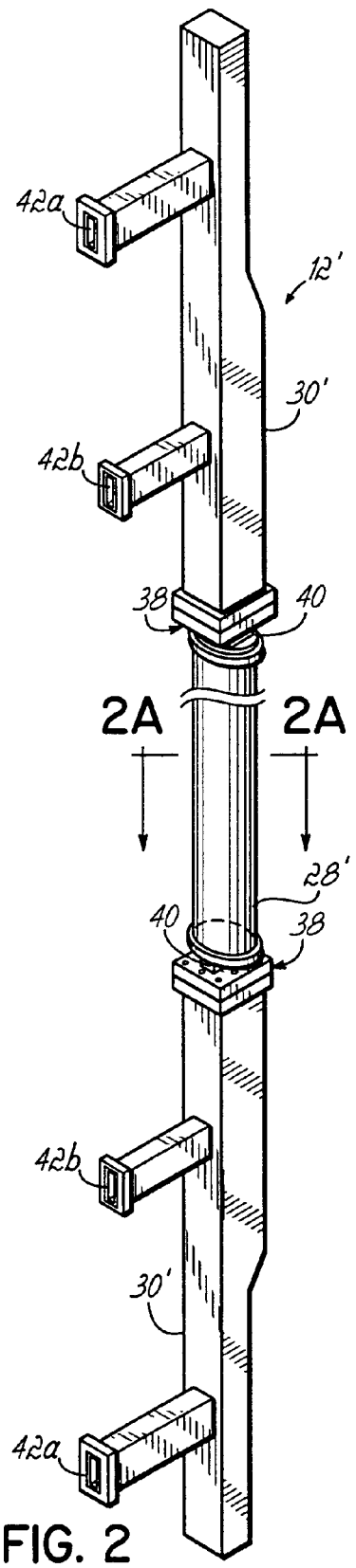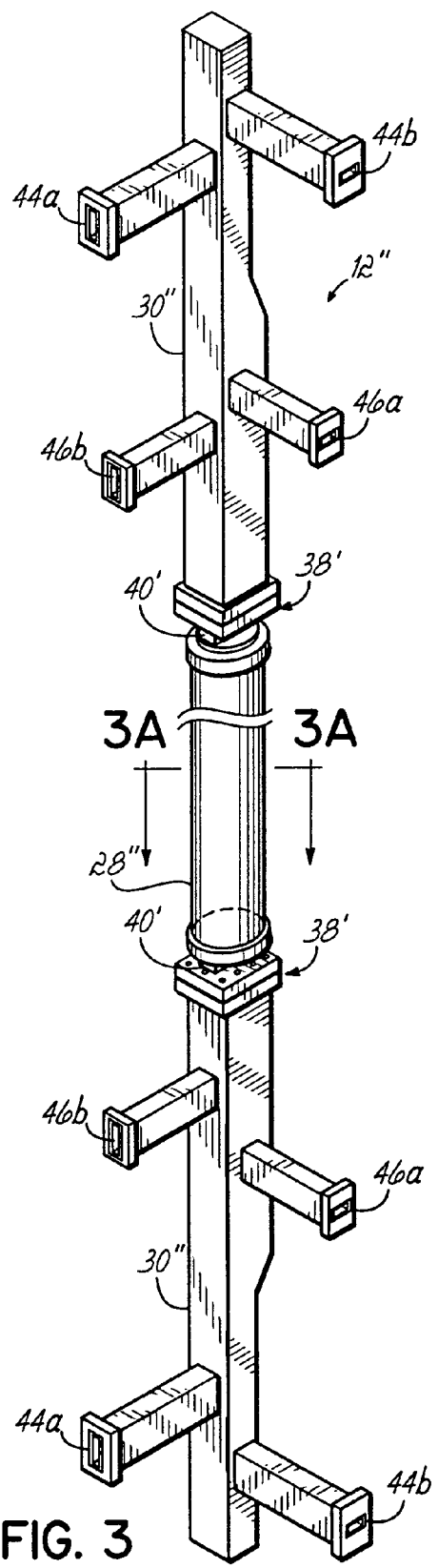
FIG. 2
FIG. 3

MULTIBAND/MULTICHANNEL WIRELESS FEEDER APPROACH

FIELD OF THE INVENTION

This invention relates generally to microwave systems, and, more particularly, to feed networks between electronics and antennas located proximate the bottom and top of a support structure, respectively.

BACKGROUND OF THE INVENTION

In wireless or cellular communications systems, a network of cells may be defined by spaced towers having antennas directed in particular directions. Usually, several antennas are mounted at or near the tops of the towers, while associated electronics, such as radio frequency (RF) power amplifiers, radios, and/or low noise amplifiers (LNAs), etc., are contained within small housings, or huts, located near the bases of the towers. Such an arrangement of a tower, antennas, and associated electronics are often referred to as a "base terminal station" (BTS) or "cell site". Moreover, some cell sites employ the same tower structure for a plurality of operators, such as AT&T, Sprint, Verizon, etc., utilizing multiple frequencies and/or applications.

Predominantly, cell sites utilize multiple coaxial cables that traverse the tower, connecting the electronics to the antennas. Unfortunately, such coaxial cables are typically very lossy, a significant amount of the power in signals being conducted by cables being dissipated or "lost" between the electronics and the antennas. For example, for transmitting a signal, a RF power amplifier may be located at the base of the tower, while the associated antenna is at the top of the tower, a coaxial cable coupling the two. Consequently, for a given amount of power delivered to the antenna, the RF power amplifier must have the additional gain necessary to overcome any losses inherent in the coaxial cable. Often, a RF power amplifier having the additional output power necessary is not realizable or is more expensive, thereby increasing the costs of the cell site, or, at a minimum, the performance of an existing amplifier may be reduced.

Conversely, in receiving a signal, the power incident on an antenna at the top of the tower is coupled, via a coaxial cable, to a radio or LNA at the base of the tower. Typically, received signals are relatively low in power, and are further reduced in power by conducting through the coaxial cable. Moreover, noise, received by such coaxial cables, may reduce in the signal-to-noise ratio (S/N). One approach to improving the S/N is to locate amplifiers, typically LNAs, at the tops of the towers to overcome the noise problems associated with the coaxial cables. However, the implementation and/or maintenance of tower top LNAs can be expensive, and the mounting and installation of LNAs somewhat difficult.

There is a need to provide a method and apparatus for coupling antennas located proximate the top of a support structure with electronics located proximate the base of the support structure to overcome losses typically associated with coaxial cables.

BRIEF DESCRIPTION OF THE DRAWINGS

The accompanying drawings, which are incorporated in and constitute a part of this specification, illustrate embodiments of the invention and, together with the detailed description given below, serve to explain the principles of the invention.

FIG. 1 is a diagram of an antenna system including a multiband/multichannel wireless feeder mounted on a tower for purposes of explaining the principles of the present invention;

FIG. 2 is a diagram, not to scale, of an exemplary multiband/multichannel wireless feeder including an elliptical waveguide in accordance with the principles of the present invention;

FIG. 2A is a cross-sectional view of the elliptical waveguide shown along line 2A—2A of FIG. 2;

FIG. 3 is a diagram, not to scale, of an alternative multiband/multichannel wireless feeder including a circular waveguide in accordance with the principles of the present invention; and, FIG. 3A is a cross-sectional view of the circular waveguide shown along line 3A—3A of FIG. 3.

DETAILED DESCRIPTION OF THE DRAWINGS

With reference to FIGS. 1–3A, wherein like numerals denote like parts, there is shown an antenna system and a multiband/multichannel wireless feeder for use therein. The wireless feeder is configured for coupling antennas located proximate the top of a support structure with electronics located proximate the base of the support structure to overcome losses typically associated with coaxial cables. More specifically, the wireless feeder comprises a waveguide and a multiplexing waveguide network located at each end of the waveguide to combine frequencies and applications.

Referring initially to FIG. 1, there is shown an exemplary antenna system 10 for purposes of explaining the principles of the present invention. Antenna system 10 includes at least one multiband/multichannel wireless feeder 12, mounted to a support structure, such as a tower 14. Tower 14 has a base 16, a portion of which is typically buried in the ground 18, and a top 20 proximate to which multiple antennas 22a, 22b are mounted. Antenna system 10 may further include electronics 24 that couple to antennas 22a, 22b, having one or more polarizations, such as through wireless feeder 12, as will be described hereinafter.

Electronics 24 may be housed in a building or hut 26, or some other suitable structure, at or adjacent tower 14, or some distance away from tower 14. In the antenna system 10 depicted in FIG. 1, hut 26 is located on the same piece of real estate, or ground 18, as tower 14.

Wireless feeder 12 comprises a waveguide 28 and a multiplexing waveguide network 30 located at each end of waveguide 28. Waveguide networks 30 couple different signals into waveguide 28 for transmission. Waveguide networks 30 are configured to combine frequencies and applications. A discussion of a "Multi-Port, Multi-Frequency Microwave Combiner with Overmoded Square Waveguide Section" may be found in U.S. Pat. No. 4,491,810, the disclosure of which is fully incorporated herein by reference. Those skilled in the art will appreciate that other combining networks, such as circular combining networks, may be used without departing from the spirit and scope of the invention.

For example, a first portion 32a of electronics 24 may be associated with a first service provider and/or application, while a second portion 32b of electronics 24 may be associated with a second service provider and/or application. Moreover, each portion 32a, 32b of electronics 24 may include one or more radio frequency (RF) power amplifiers 34a, 34b and one or more radios or low noise amplifiers (LNAs) 36a, 36b. Thus, feeder 12 may combine or multiplex frequencies, i.e., transmit and receive, in a manner that reduces the number of feeders required.

Further, as configured in FIG. 1, antennas 22a, 22b may be associated with electronics 32a, 32b, respectively. Thus, antenna 22a may be utilize by a first service provider or used by a first application 32a, while antenna 22b may be simultaneously utilized by a second service provider or used by a second application 32b. Thus, feeder 12 may also combine applications in a manner that reduces the number of feeders required.

Those skilled in the art will appreciate that additional feeders may, along with any necessary associated antennas or electronics, be used as required for additional applications and/or service providers.

Referring now to FIG. 2, a diagram of an exemplary multiband/multichannel wireless feeder 12' including an elliptical waveguide 28' is shown. FIG. 2A shows a cross-sectional view of elliptical waveguide 28' along line 2A—2A of FIG. 2 for purposes of further illustration.

An advantage of an elliptical waveguide is manufacturing and/or installation convenience. An elliptical waveguide is often comprised of a strip of copper that is corrugated, folded over, welded and jacketed. Further, elliptical waveguides are typically available in continuous lengths up to practical shipping limits of approximately 3,000 feet, the only joints being connectors at each end. The connectors of elliptical waveguide 28' are indicated a reference numeral 38. Portions 40 of connectors 38 form a transition between the elliptical cross-sections 2A—2A and a rectangular coupling (not shown), as will be appreciated by those skilled in the art.

Another advantage of an elliptical waveguide is ease of installation. Thus, unlike a rigid or rectangular waveguide, an elliptical waveguide may be bent or curved without damage, and more importantly, without electrical degradation. This curving eases installation of the elliptical waveguide, such as transitioning from tower 14 to hut 26, shown in FIG. 1.

Referring still to FIG. 2, wireless feeder 12' comprises a multiplexing waveguide network 30' located at each end of elliptical waveguide 28' to combine frequencies, i.e., transmit and receive, and applications, e.g., a third generation (3G) wireless system and a personal communications services (PCS) system. To this end, waveguide networks 30' comprise ports 42a and 42b having a single polarization. A limitation of an elliptical waveguide is ability to support only one polarization.

Those skilled in the art will appreciate that the physical dimensions of elliptical waveguide 28' and waveguide networks 30' determine, in part, the usable frequency range of wireless feeder 28'. The further specifics of constructing such an elliptical waveguide and waveguide networks, and the tuning of the same, are well known to those skilled in the art.

For example, a 3G wireless system covering 1,920 to 2,170 Megahertz (MHz), as assigned to 3G services throughout most of the world, may utilize antenna 22a having a single polarization and electronics 32a, shown in FIG. 1, through ports 42a, while a PCS system, e.g., 1,800 or 1,900 MHz, utilizes antenna 28b also having a single polarization and electronics 28b through ports 42b. Moreover, the 3G system and the PCS system may be owned and operated by the same or different service providers, such as, for example, AT&T, Sprint, Verizon, etc. Those skilled in the art will appreciate that other systems, e.g., 2G, 2.5G, GRPS, IMT-2000, UMTS, CDMA, W-CDMA, FOMA, CDMA2000, etc., using differing or the same frequencies may also be used as desired without departing from the present invention.

Referring now to FIG. 3, a diagram of an alternative multiband/multichannel wireless feeder 12" including a circular waveguide 28" is shown. FIG. 3A shows a cross-sectional view of circular waveguide 28" along line 3A—3A of FIG. 3 for purposes of further illustration.

A circular waveguide may be preferred to a rectangular or elliptical waveguide in installations where longer lengths are required since circular waveguides generally have less attenuation than either rectangular or elliptical wavegides. As will be appreciate by those skilled in the art, a principle difference between a circular waveguide and rectangular or elliptical waveguide is the manner in which energy is fed and removed from the waveguide. Further, due to symmetrical construction, a circular waveguide is configured to support circular, horizontal, and vertical polarizations, or dual polarizations. Thus, one advantage of a circular waveguide may be the ability to support dual or multiple polarizations.

Referring still to FIG. 3, the connectors of circular waveguide 28" are indicated a reference numeral 38'. Portions 40' of connectors 38' form a transition between the circular cross-section 3A—3A and a coupling (not shown) resulting in a closed system, as will be appreciated by those skilled in the art.

Those skilled in the art will appreciate that the physical dimensions of circular waveguide 28" and waveguide networks 30" determine, in part, the usable frequency range of wireless feeder 28". The further specifics of constructing such a circular waveguide and waveguide networks, and the tuning of the same, are well known to those skilled in the art.

Wireless feeder 12" comprises a multiplexing waveguide network 30" located at each end of circular waveguide 28" to combine frequencies, i.e., transmit and receive, and applications, e.g., a third generation (3G) wireless system and a personal communications services (PCS) system. To this end, waveguide networks 30" comprise ports 44a–b and 46a–b.

For example, a 3G wireless system may utilize antenna 22a having a dual polarization and electronics 32a, shown in FIG. 1, through ports 44a and 44b, a first and second polarization being associated with ports 44a and 44b, respectively. Simultaneously, a PCS system may antenna 28b also having a dual polarization and electronics 28b through ports 46a and 46b. The 3G system and the PCS system may be owned and operated by the same or different service providers, such as, for example, AT&T, Sprint, Verizon, etc. Those skilled in the art will appreciate that other systems, e.g., 2G, 2.5G, GRPS, IMT-2000, UMTS, CDMA, W-CDMA, FOMA, CDMA2000, etc., using differing or the same frequencies may also be used as desired without departing from the present invention.

While the present invention has been illustrated by the description of the embodiments thereof, and while the embodiments have been described in considerable detail, it is not the intention of the applicants to restrict or in any way limit the scope of the appended claims to such detail. For example, it will be understood that an antenna may have one or more, e.g., dual, polarizations. Moreover, a waveguide may be elliptical, circular, or even rectangle or rigid, each having their own particular advantages depending on the installation. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicants' general inventive concept.

What is claimed is:

1. An antenna system for a base station comprising:
    a support structure; and
    a multiband/multichannel wireless feeder configured for coupling an antenna located proximate the top of a support structure with electronics located proximate the base of the support structure;
    the multiband/multichannel wireless feeder including a bendable waveguide and a first multiplexing waveguide network coupled at an end of the bendable waveguide to couple with multiple antennas and a second multiplexing waveguide network coupled at an opposite end of the bendable waveguide to couple simultaneously with electronics operating in at least two different frequency bands, the multiplexing waveguide networks configured to combine multiple frequencies and applications associated with the antennas and electronics;
    to overcome losses typically associated with coaxial cables.

2. The antenna system of claim 1, wherein the bendable waveguide is an elliptical waveguide.

3. The antenna system of claim 1, wherein the bendable waveguide is a circular waveguide.

4. The antenna system of claim 1, wherein a first application is in a 3G system and is combined by the waveguide network with a second application that is in a PCS system.

5. The antenna system of claim 1 wherein said applications include at least one of a 2G, 2.5G, GRPS, IMT-2000, UMTS, CDMA, W-CDMA, FOMA, CDMA2000 system.

6. The antenna system of claim 1 wherein the multiplexing waveguide network includes a multi-frequency waveguide combiner.

7. The antenna system of claim 6 wherein the waveguide combiner utilizes a single polarization.

8. The antenna system of claim 6 wherein the waveguide combiner utilizes multiple polarizations.

9. A multiband/multichannel wireless feeder configured for use in a base station to couple antennas with electronics of the base station, the multiband/multichannel wireless feeder comprising:
    a bendable waveguide having a coupling at each end;
    a first multiplexing waveguide network coupled at an end of the waveguide and configured to couple with multiple antennas;
    a second multiplexing waveguide network coupled at an opposite end of the waveguide to couple simultaneously with electronics of the base station operating in at least two different frequency bands, the multiplexing networks configured to combine multiple frequencies and applications associated with the antennas and electronics.

10. The multiband/multichannel wireless feeder of claim 9, wherein the bendable waveguide is an elliptical waveguide.

11. The multiband/multichannel wireless feeder of claim 9, wherein the flexible bendable waveguide is a circular waveguide.

12. The multiband/multichannel feeder of claim 9, wherein the first application is in a 3G system and is combined by the waveguide network with the second application that is in a PCS system.

13. The multiband/multichannel wireless feeder of claim 9 wherein said applications include at least one of a 2G, 2.5G, GRPS, IMT-2000, UMTS, CDMA, W-CDMA, FOMA, CDMA2000 system.

14. The multiband/multichannel wireless feeder of claim 9 wherein the multiplexing waveguide network includes a multi-frequency waveguide combiner.

15. The multiband/multichannel wireless feeder of claim 9 wherein the waveguide combiner utilizes a single polarization.

16. The multiband/multichannel wireless feeder of claim 9 wherein the waveguide combiner utilizes multiple polarizations.

17. A method of transmitting wireless signals at a base station between an antennas proximate the top of a support structure and electronics proximate the base of a support structure, the method comprising:
    coupling antennas located proximate the top of a support structure to a first multiplexing waveguide network and coupling electronics operating in at least two different frequency bands and located proximate the base of the support structure to a second multiplexing waveguide network, the multiplexing waveguide networks respectively configured to combine frequencies and applications associated with the antennas and electronics;
    coupling a bendable waveguide between the respective multiplexing waveguide networks to extend along the support structure and couple together the antennas and electronics to handle the frequencies and applications associated therewith.

18. The method of claim 17 wherein the multiplexing waveguide networks are configured to handle multiple different applications.

19. The method of claim 18 wherein said applications include at least one of a 2G, 2.5G, GRPS, IMT-2000, UMTS, CDMA, W-CDMA, FOMA, CDMA2000 system.

20. The method of claim 17 wherein the multiplexing waveguide networks include a multi-frequency waveguide combiner for handling different frequencies.

21. The method of claim 20 wherein the waveguide combiner utilizes a single polarization.

22. The method of claim 20 wherein the waveguide combiner utilizes multiple polarizations.

23. The method of claim 17, wherein the waveguide is an elliptical waveguide.

24. The method of claim 17, wherein the waveguide is a circular waveguide.

25. A wireless communication system base station comprising:
    a support structure;
    at least two antennas proximate a top of the support structure;
    electronics located proximate a base of the support structure operating in at least two different frequency bands;
    a multiband/multichannel wireless feeder configured for coupling the antenna with the electronics;
    the multiband/multichannel wireless feeder including:
    a bendable waveguide extending along the support structure; and
    a first multiplexing waveguide network coupled at an end of the waveguide and coupled respectively with the multiple antennas and a second multiplexing waveguide network coupled at an opposite end of the waveguide to couple simultaneously with the electronics, the multiplexing waveguide networks configured to combine multiple frequencies and applications associated with the antenna and electronics;

to overcome losses typically associated with coaxial cables.

26. The wireless communication system of claim 25, wherein the bendable waveguide is an elliptical waveguide.

27. The wireless communication system of claim 25, wherein the bendable waveguide is a circular waveguide.

28. The wireless communication system of claim 25, wherein a first application is in a 3G system and is combined by the waveguide network with a second application that is in a PCS system.

29. The wireless communication system of claim 25 wherein said applications include at least one of a 2G, 2.5G, GRPS, IMT-2000, UMTS, CDMA, W-CDMA, FOMA, CDMA2000 system.

30. The wireless communication system of claim 25 wherein the multiplexing waveguide networks each include a multi-frequency waveguide combiner.

31. The wireless communication system of claim 25 wherein the waveguide combiner utilizes a single polarization.

32. The wireless communication system of claim 25 wherein the waveguide combiner utilizes multiple polarizations.

* * * * *